Patented Nov. 26, 1929

1,736,909

UNITED STATES PATENT OFFICE

ROBERT L. FRINK, OF LANCASTER, OHIO

METHOD OF MAKING REFRACTORIES

No Drawing. Application filed September 18, 1926, Serial No. 136,384. Renewed October 24, 1928.

This invention relates to materials capable of withstanding high temperatures, and has more particular reference to materials for refractory articles, linings, etc. It has long been known that there are refractory materials more efficient than those customarily used, but since these are of such high melting point, there has been no feasible way of shaping them as required. Desirable materials have accordingly necessarily been passed over for lack of means for working them up. In accordance with the present invention I have found that with proper procedure such very high melting point materials can be brought into shape for usage as desired.

To the accomplishment of the foregoing and related ends, the invention, then, consists in the features hereinafter fully described and particularly pointed out in the claims, the following description setting forth in detail but one of the various ways in which the principle of the invention may be employed.

In accordance with my invention, materials in a practical sense commonly regarded as infusible are comminuted more or less and are treated in a menstruum of practicable melting point, whereby the material may be made into an integral mass and may be shaped as desired.

Natural or artificial sillimanite, cyanite, bauxite, andalusite, ceria, zirconia, magnesia, garnite, rutile, or other refractory minerals, or for some less important usages, even a burned clay, may be comminuted more or less, but preferably in graded sizes and in proportions such as to give a predetermined amount of voids or interstitial space. There is also admixed therewith a quantity of material fusible at a lower temperature. This latter material may be, if desired, made up and fused separately and powdered and classified as to size, and in this form then be admixed with the refractory in suitable quantities of each. The mixture may be put in a mold and be heated to fusion of the menstruum and pressure can be applied if desired. There can thus be obtained a refractory body made up of highly refractory material bonded together with a medium of practicable melting point but of such relatively small quantity as not to substantially interfere with the refractory properties of the predominant material. The usefulness of result will be furthered also if the medium be chosen to have a co-efficient of expansion approximating that of the predominant refractory material. For instance, a bond material may be made up of silica, boric acid, alkali earths and alkalis, such as to have a very low co-efficient of expansion.

A convenient and especially desirable procedure is as follows: A highly refractory material of the character above described, for example sillimanite or mullite, is comminuted and sized, for instance in proportions such that 50 per cent of the particles pass a 1/4th inch screen, 20 per cent pass a 1/8th inch screen, 10 per cent pass a 1/20th inch screen, and 10 per cent pass a 1/40th inch screen but not a 1/80th inch screen. These proportions may of course be varied as desired.

A bonding medium comprising silica, boric acid, and alkali is fused, powdered and classified, and this frit to the extent of 10 per cent for instance is mixed with 90 per cent of the sized and graded sillimanite. A feasible composition for the bonding medium may be made up of calcined or ignited silica 60 parts, boric acid 20 parts, magnesium carbonate 5 parts, and sodium carbonate 5 parts.

The mixture may now be charged into a rotary kiln and subjected to a temperature sufficient to fuse the bond medium and coat each grain of refractory material and to some extent react therewith, and by properly proportioning the lesser fusible refractory materials with the still less fusible bonding material and in turn subjecting the same to a sufficiently high temperature over a required period of time, it is possible to rearrange the molecules composing the mass whereby the fusion temperature of the mass is materially increased. With a suitable speed of rotation of the kiln and an adequate angle of inclination as related to the temperature, the mass can be discharged in sufficiently fluent condition to fill molds of desired form, and pressure can then be applied by any usual or desired means to complete the forming operation. The filled mold or the molded article removed from the mold can further, if desired, be subjected to annealing, the temperature being gradually reduced at a rate to minimize internal stresses.

It will thus be seen that by the present method refractory material in desired shape may be made up as readily as the usual clay refractories, and yet in such manner as to eliminate the usual high costs of labor and overhead involved in the making of such material. It should, furthermore, be explained that the material need not necessarily be molded into any prescribed shape, but may be applied in fluent form (as by means of a so-called "blast-gun" such as is used in coating with molten metal) directly onto the surface of the furnace or tank wall. In other words, such wall may be built up or faced in situ with the material instead of with molded blocks thereof.

Other modes of applying the principle of my invention may be employed, change being made as regards the details described, provided the step or steps stated by any of the following claims, or the equivalent of such, be used.

My copending application, Serial No. 359,366, filed April 30, 1929, as a continuation of application Serial No. 136,383 of September 18, 1926, describes and broadly claims a refractory material, a low temperature cement and constituents capable of fusing to a glass-like bond upon heating.

I therefore particularly point out and distinctly claim as my invention:—

1. A method of making refractories, which comprises admixing with a comminuted refractory material a preliminarily fused siliceous material of lower melting point, and passing the mixture through a heated zone to bond the refractory material.

2. A method of making refractories, which comprises admixing with a comminuted refractory material a siliceous material of lower melting point, passing the mixture through a heated zone to fuse the lower melting point material, and heating to flowage.

3. A method of making refractories, which comprises admixing with a comminuted refractory material a siliceous material of lower melting point, passing the mixture through a heated zone to fuse the lower melting point material, and then further heating to flowage.

4. A method of making refractories, which comprises admixing with a comminuted refractory material a siliceous material of lower melting point, passing the mixture through a heated zone to fuse the lower melting point material, and molding.

5. A method of making refractories, which comprises admixing with a comminuted refractory material a siliceous material of lower melting point, passing the mixture through a heated zone to fuse the lower melting point material, heating to flowage, and molding.

6. A method of making refractories, which comprises admixing with a comminuted refractory material a siliceous material of lower melting point, passing the mixture through a heated zone to fuse the lower melting point material, further heating to flowage, and then molding.

7. A method of making refractories, which comprises passing a refractory material and a preliminarily fused siliceous bond material through a zone heated to melt the bond material and produce union.

8. A method of making refractories, which comprises passing a refractory material and a siliceous bond material through a zone heated to cause flowage of the bond material, and then molding.

9. A method of making refractories, which comprises comminuting a refractory material, compounding this material in graded sizes to reduce voids, admixing a preliminarily fused bond material, and passing the mixture through a zone heated to melt the bond material and produce union.

10. A method of making refractories, which comprises comminuting a refractory material, compounding this material in graded sizes to reduce voids, admixing a fusible bond material, passing the mixture through a zone heated to cause flowage of the bond material, and then molding.

11. A method of making refractories, which comprises admixing with a comminuted refractory material a siliceous material of lower melting point, passing the same through a heated zone to fuse the lower melting point material, molding, and finally gradually reducing the temperature of the molded form to minimize internal stresses.

12. A method of making refractories, which comprises comminuting a refractory material, compounding this material in graded sizes to reduce voids, admixing a preliminarily fused bond material, passing the mixture through a zone heated to fuse the bond material and produce union, and finally gradually reducing the temperature of the molded form to minimize internal stresses.

13. A method of making refractories, which comprises comminuting a refractory material, compounding this material in graded sizes to reduce voids, admixing a fusible bond material, passing the mixture through a zone heated to cause flowage of the bond material, then molding, and finally gradually reducing the temperature of the molded form to minimize internal stresses.

14. A method of making refractories, which comprises admixing with a comminuted refractory material a preliminarily fused siliceous bonding material whose coefficient of expansion approximates that of the refractory material, and heating the mixture to effect a bond.

15. A method of making refractories, which comprises admixing with a comminuted refractory material a siliceous material of lower melting point but having a coefficient of expansion approximating that of the refractory material, and heating the mixture to effect a bond.

Signed by me, this 15 day of September, 1926.

ROBERT L. FRINK.